US006623584B2

(12) United States Patent
Caretta

(10) Patent No.: US 6,623,584 B2
(45) Date of Patent: Sep. 23, 2003

(54) METHOD OF MANUFACTURING A CARCASS STRUCTURE AND A VEHICLE TIRE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 17 days.

(21) Appl. No.: 09/843,769

(22) Filed: Apr. 30, 2001

(65) Prior Publication Data

US 2001/0025682 A1 Oct. 4, 2001

Related U.S. Application Data

(63) Continuation of application No. PCT/EP99/07962, filed on Oct. 20, 1999.
(60) Provisional application No. 60/114,158, filed on Dec. 29, 1998.

(30) Foreign Application Priority Data

Oct. 30, 1998 (EP) .............................................. 98830662

(51) Int. Cl.[7] .......................... B60C 9/02; B60C 15/00; B60C 15/06; B29D 30/08; B29D 30/32
(52) U.S. Cl. .................... 156/133; 156/110.1; 156/123; 156/131; 156/135; 152/540; 152/541; 152/548; 152/550
(58) Field of Search ............................... 152/539, 540, 152/541, 545, 548, 550; 156/110.1, 117, 133, 135, 131, 123

(56) References Cited

U.S. PATENT DOCUMENTS

| 1,611,998 A | | 12/1926 | Comstock |
| 3,072,171 A | | 1/1963 | Drakeford et al. |
| 3,240,250 A | * | 3/1966 | Frazier ........................ 152/560 |
| 4,248,287 A | | 2/1981 | Christman ................... 152/354 |
| 5,362,343 A | | 11/1994 | Debroche |
| 5,419,384 A | * | 5/1995 | Iseki ........................... 152/548 |
| 5,453,140 A | | 9/1995 | Laurent et al. .............. 156/117 |
| 5,660,656 A | | 8/1997 | Herbelleauu et al. ....... 152/547 |
| 5,702,548 A | | 12/1997 | Arnaud et al. .............. 152/547 |
| 6,318,432 B1 | | 11/2001 | Caretta et al. |
| 6,328,084 B1 | | 12/2001 | Caretta et al. |

FOREIGN PATENT DOCUMENTS

| EP | 0 664 231 | 7/1995 |
| FR | 384.231 | 4/1908 |
| FR | 750.726 | 4/1933 |

OTHER PUBLICATIONS

Caretta et al.; "A Method for Making Tires for Vehicle Wheels", U.S. patent application Ser. No. 09/219,422, filed on Dec. 23, 1998.
Caretta; "Method for Manufacturing a Carcass Structure for Tyres for Vehicle Wheels and a Carcass Structure", U.S. patent application Ser. No. 09/362,998, filed on Jul. 30, 1999.

* cited by examiner

Primary Examiner—Michael W. Ball
Assistant Examiner—Justin Fischer
(74) Attorney, Agent, or Firm—Finnegan, Henderson, Farabow, Garrett & Dunner, L.L.P.

(57) ABSTRACT

A method of manufacturing a carcass structure for vehicle tires includes preparing strip sections, each comprising longitudinal and parallel thread elements coated at least partly with at least one layer of raw elastomer material. A first series of strip sections is laid down onto a toroidal support. First primary portions of annular reinforcing structures are applied against end flaps of the first series strip sections. At least one second series of strip sections is laid down onto the toroidal support. Together, the first and second series define a first carcass ply. A third series of strip sections is laid down onto the toroidal support. Second primary portions of the annular reinforcing structures are applied against end flaps of the third series strip sections. At least one fourth series of strip sections is laid down onto the toroidal support. Together, the third and fourth series define a second carcass ply.

15 Claims, 5 Drawing Sheets

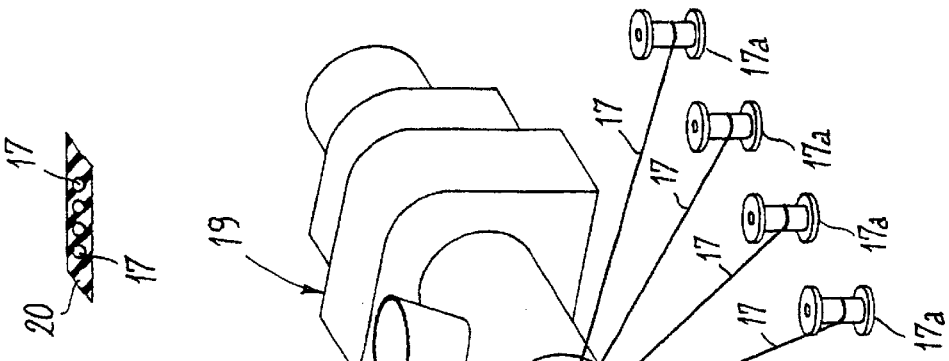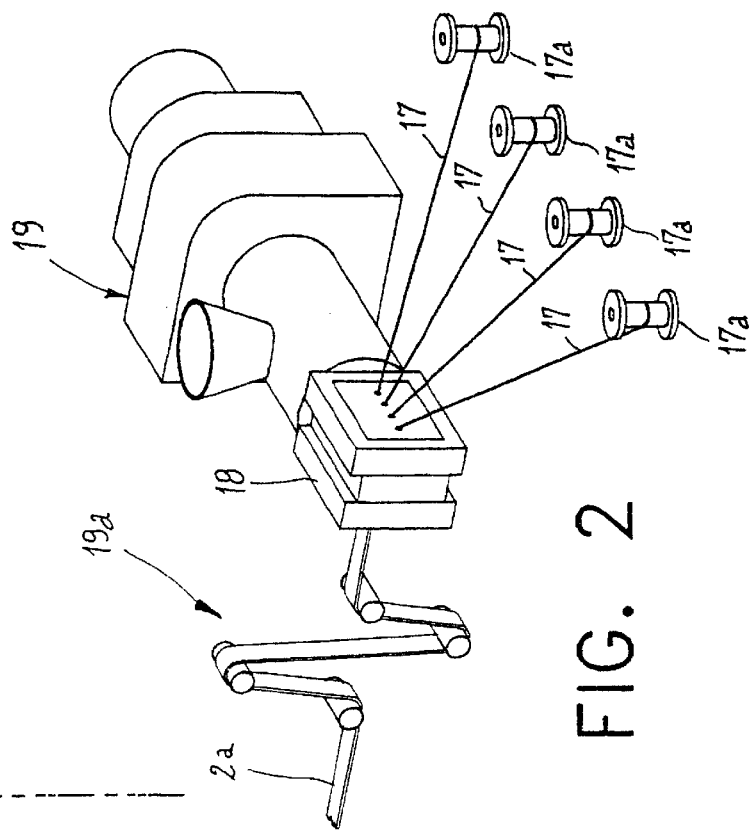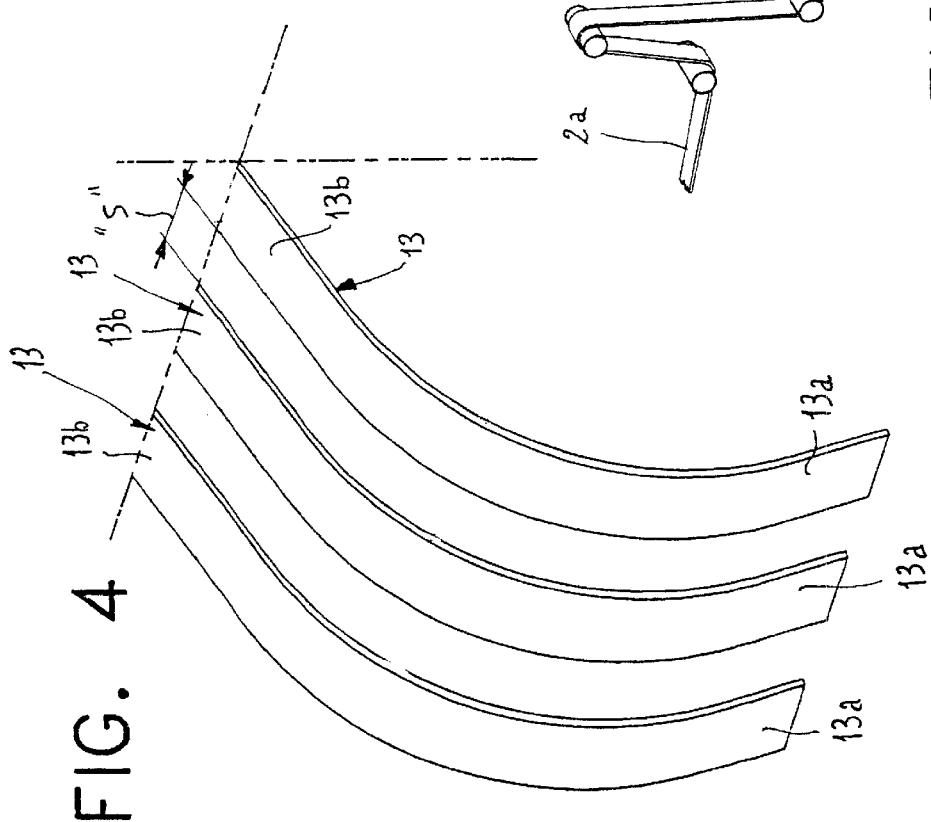

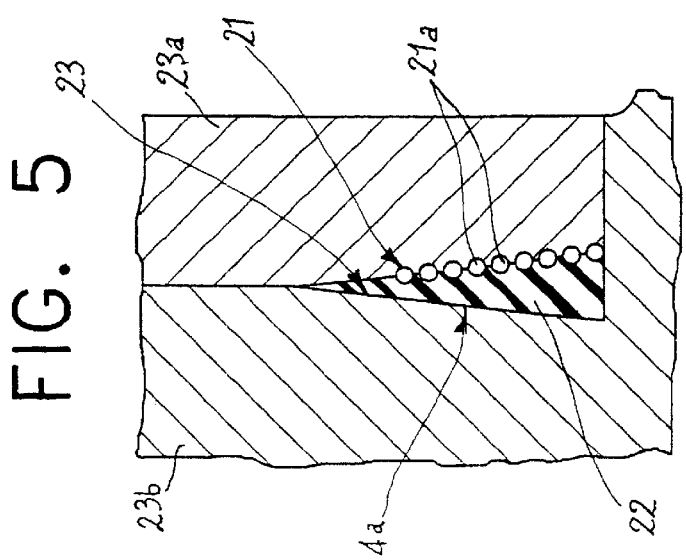
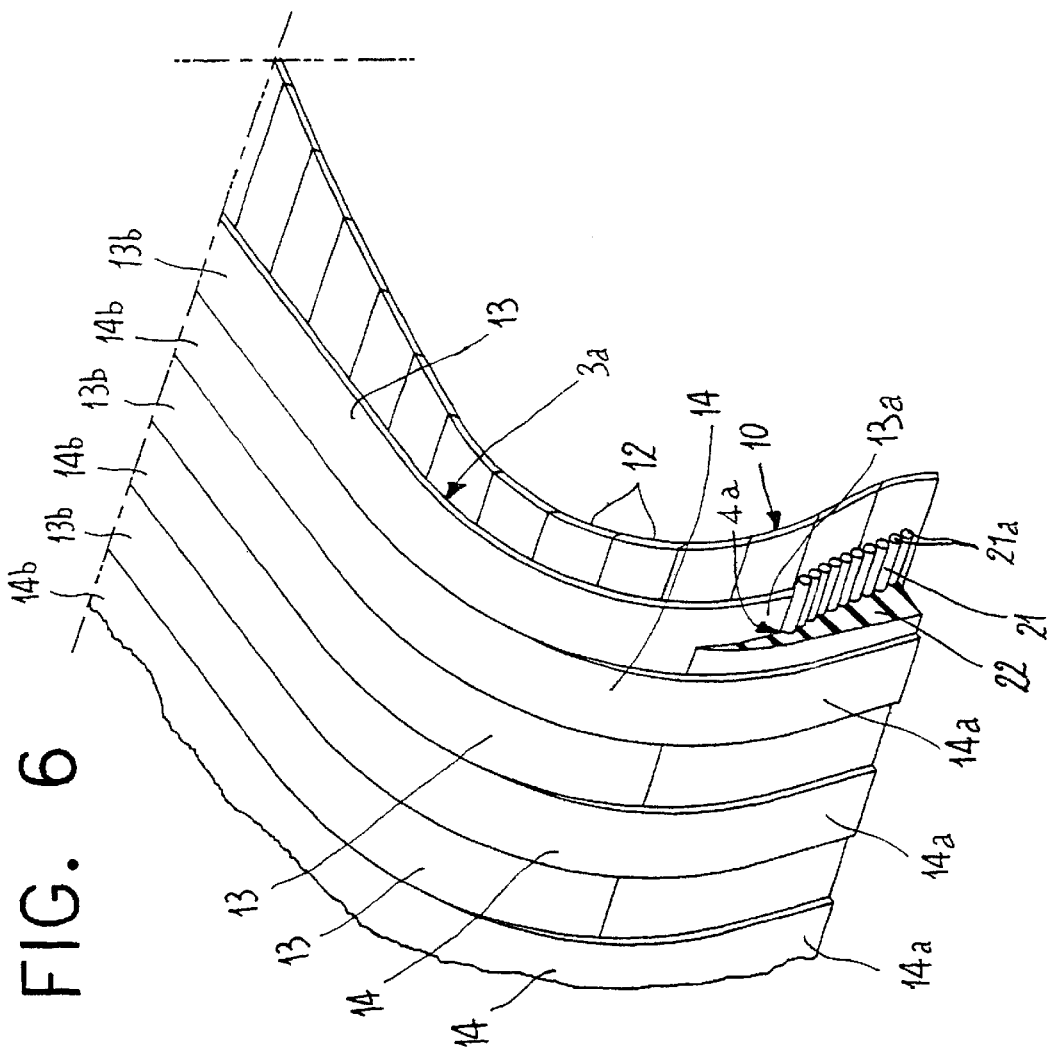

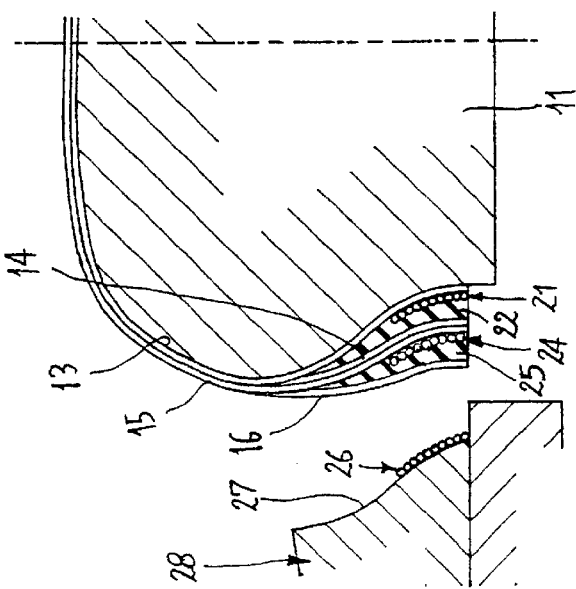
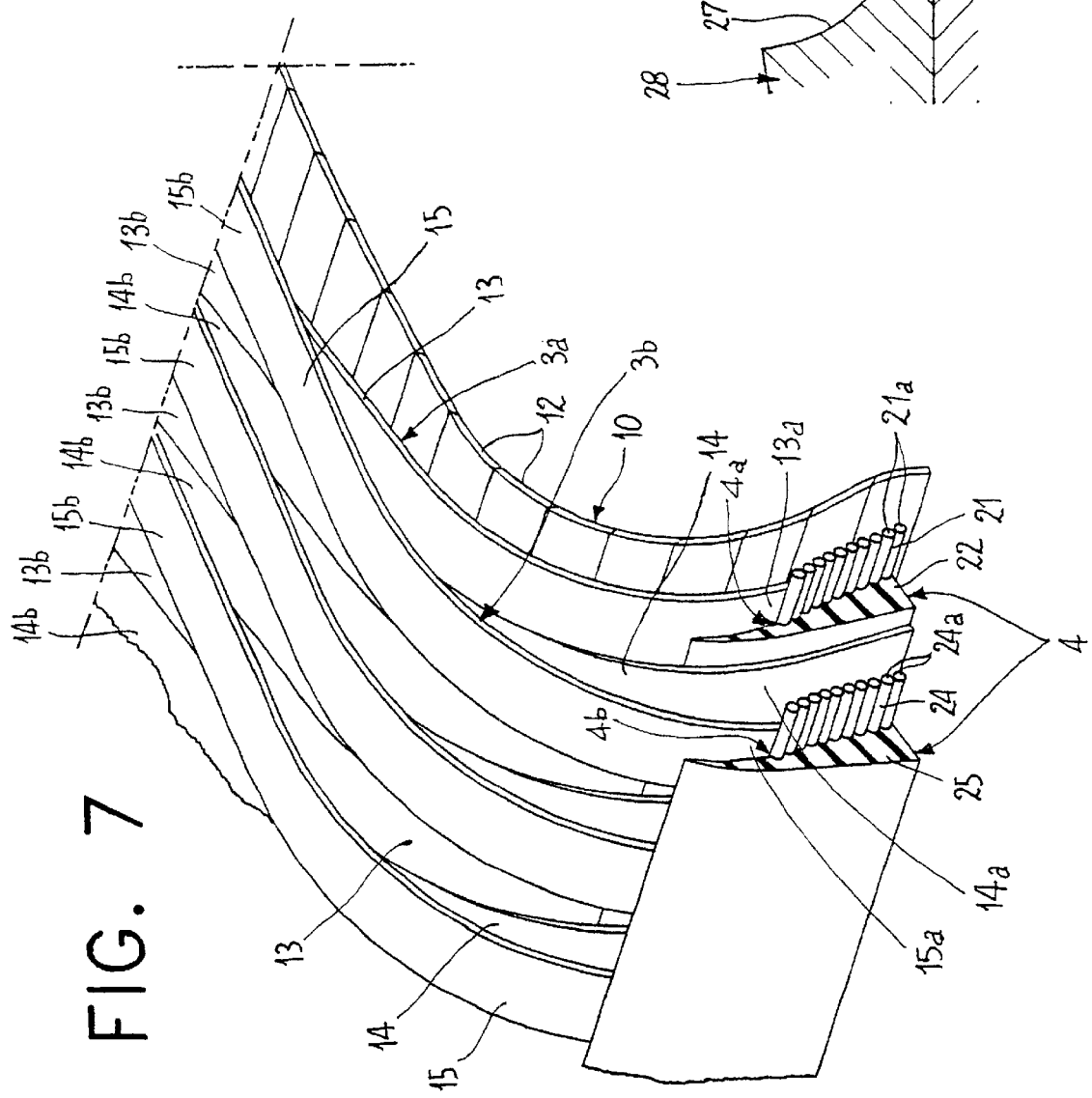

METHOD OF MANUFACTURING A CARCASS STRUCTURE AND A VEHICLE TIRE

CROSS-REFERENCES TO RELATED APPLICATIONS

This application is a continuation of International Patent Application No. PCT/EP99/07962, filed Oct. 20, 1999, in the European Patent Office; additionally, Applicants claim the right of priority under 35 U.S.C. §119(a)–(d) based on patent application No. 98830662.7, filed Oct. 30, 1998, in the European Patent Office; further, Applicants claim the benefit under 35 U.S.C. §119(e) based on prior-filed, now abandoned provisional application No. 60/114,158, filed Dec. 29, 1998, in the U.S. Patent and Trademark Office; the contents of all of which are relied upon and incorporated herein by reference.

BACKGROUND OF THE INVENTION

Field of the Invention

The present invention relates to a method of manufacturing a carcass structure for tires for vehicle wheels.

The invention also relates to a carcass structure for tires for vehicle wheels obtainable by the above method, said carcass structure comprising; at least one carcass ply formed of strip-like sections each of which extends in a substantially U-shaped conformation following the cross-section outline of the tire and comprises one or more thread-like elements longitudinally arranged parallelly of each other and preferably at least partly coated with a layer of raw elastomer material; and a pair of annular reinforcing structures each engaged close to a respective inner circumferential edge of the carcass ply.

DESCRIPTION OF THE RELATED ART

Manufacture of tires for vehicle wheels involves formation of a carcass structure essentially made up of one or more carcass plies substantially having a toroidal conformation and presenting their axially opposite side edges engaged to respective annular, circumferentially inextensible, reinforcing elements usually referred to as "bead cores".

Applied to the carcass structure, at a circumferentially outer position, is a belt structure comprising one or more belt strips having the shape of a closed ring, which are essentially made up of textile or metal cords suitably oriented relative to each other and to the cords belonging to the adjacent carcass plies.

Then, at a circumferentially outer position of the belt structure a tread band is applied which usually consists of a strip of elastomer material of suitable thickness.

It is to point out that, to the aims of the present description, by the term "elastomer material" it is intended a rubber blend in its entirety, i.e. the assembly formed of a base polymer suitably amalgamated with mineral fillers and/or process additives of various types.

Ultimately, a pair of sidewalls is applied to the opposite sides of a tire being manufactured, each of said sidewalls covering a side portion of the tire included between a so-called shoulder region, arranged close to the corresponding side edge of the tread band, and a so-called bead arranged at the corresponding bead core.

The traditional production methods essentially provide that the above listed tire components should be first made separately of each other, to be then assembled during a manufacturing step of the tire.

For example, for making the carcass ply or plies to be associated with the bead cores in order to form the carcass structure, it is first required that, by an extrusion and/or calendering process, a rubberized fabric comprising longitudinally-disposed continuous textile or metal cords should be produced. This rubberized fabric is submitted to a transverse cutting operation to produce sections of predetermined lengths that are subsequently joined together so as to give origin to a continuous ribbon-like semifinished product, having transversely-arranged parallel cords.

This manufactured article must then be cut into sections the length of which is correlated with the circumferential extension of the carcass to be produced.

Manufacturing methods have been also proposed in which, instead of resorting to production of semifinished articles, the carcass structure is made directly during the tire manufacturing steps.

For example, U.S. Pat. No. 5,453,140 herein referred to as an example of the most pertinent state of the art, discloses a method and an apparatus forming a carcass ply starting from a single cord that has been previously wound up on a reel.

In accordance with the method and apparatus described in the above patent, at each working cycle of the apparatus the cord taken up from the reel by power-driven pulling rollers and maintained taut by a pneumatic tensioning system is cut to size so as to obtain a section of a predetermined length.

The cord section is taken up by a grip element mounted on a belt looped around power-driven pulleys to be transversely laid down on the outer surface of a toroidal support.

The section ends are then engaged by folding members of the belt type operating on opposite sides of the toroidal support to radially apply the cord section to the toroidal support itself by slider elements acting like fingers along the section side portions.

Repetition of the above described working cycle leads to deposition of these cord sections in a circumferential side-by-side relationship until the whole circumferential extension of the toroidal support is covered.

Necessarily, the toroidal support is previously coated with one or more raw rubber layers having a dual function, that of adhering to the cords laid down thereon so as to conveniently hold them in a fixed positioning, and that of forming an inner air-proof layer in the finished tire.

Tires obtained by this manufacturing method have a carcass structure in which the carcass ply or plies are formed of individual cords each having two side portions axially spaced apart from each other and radially oriented relative to the rotation axis of the tire, and a crown portion extending at a radially outer position between the side portions.

Within the scope of the carcass structure manufacture, it is also known that close to each of the tire beads, the opposite ends of the individual cords forming a carcass ply are arranged in an alternating sequence, at axially opposite positions relative to an annular anchoring element forming said bead core, having the shape of a crown made up of radially-overlapping thread or wire coils, as can be viewed from Patent EP 0 664 231 and U.S. Pat. No. 5,702,548.

In the above mentioned art all cords forming the carcass ply or plies however, are substantially arranged in the neutral axis of resistance to bending of the respective bead. Under this circumstance, the structural resistance of the beads must necessarily rely on the stiffness of the filling inserts of very hard elastomer material incorporated into the bead structure, the behaviour of which feels the effects of temperature changes due both to environmental factors and to stresses produced during normal operation.

In Patent FR 384 231 it is proposed to make a carcass structure by deposition on a toroidal support, of a series of rectangular small bands of rubberized fabric disposed circumferentially in side-by-side relationship and arranged in radial planes relative to the geometric axis of the support drum itself. Deposition of the small bands is carried out in such a manner that the end flaps of two non-consecutive small bands are partly covered with the end flaps of the small band interposed therebetween. Spaces existing between the end flaps of the covered small bands are filled with trapezoidal inserts applied to the end flaps of the small band placed in overlapping relationship thereon. Deposition of the small bands is executed in different overlapped layers, the number of which is correlated with the thickness to be given to the carcass structure. The presence of said trapezoidal inserts gives rise to thickening of the carcass structure at the bead regions, where it has a thickness which is twice that found at the crown.

In U.S. Pat. No. 4,248,287 it is disclosed a method according to which formation of the carcass structure involves that a plurality of layers each formed of radial strips consisting of rubberized threads and circumferentially disposed in side by side relationship should be laid down on a toroidal drum. When deposition has been completed, at the bead region two bead cores are applied and the end flaps of the carcass layers formed by the radial strips are then turned back around them.

The Applicant has found that important advantages can be achieved, both in terms of simplification of the production processes and in terms of improvement of the behavioural features of the tire, if the carcass ply or plies are manufactured by conveniently laying down strip-like sections, each comprising a plurality of cords parallel to each other incorporated into an elastomer layer, onto a rigid toroidal support.

In this connection the Applicant has already developed several manufacturing methods being the object of respective European patent applications.

For instance, in European patent applications No. 97830731.2 and No. 97830733.8 a manufacturing method and a tire are respectively described in which the carcass structure is obtained by making a first and a second carcass plies each accomplished by strip-like sections laid down sequentially in a circumferential side-by-side relationship.

Tires obtained as described in these patent applications have the end portions of the strip-like sections belonging to the first and second carcass plies disposed on respectively opposite sides relative to the annular reinforcing structures of the beads.

This expedient, in combination with the respectively crossed orientation of the strip-like sections belonging to one and the other carcass plies, offers important advantages in terms of structural resistance of the tire close to the beads and the sidewalls.

In the European patent application No. 98830472.1, in the name of the same Applicant as well, accomplishment of a carcass ply is proposed which is carried out by depositing a first and a second series of strip-like sections in alternated sequence, in which the sections belonging to the first and second series terminate at respectively opposite sides relative to the reinforcing structures of the beads.

Advantages can be thus achieved in terms of structural resistance at the tire beads and sidewalls even in the presence of a single carcass ply.

SUMMARY OF THE INVENTION

In accordance with the present invention, it has been found that, for achieving exceptional qualities of mechanical resistance to stresses induced in the acceleration and deceleration steps, as well as in a condition of slip running, it is convenient that two carcass plies should be arranged which are each formed of two series of strip-like sections laid down in an alternated sequence, the sections of each ply terminating at respectively opposite sides of a respective portion of the reinforcing structure at the bead.

In particular, it is an object of the invention to provide a method of manufacturing a carcass structure for motor-vehicle tires, characterized in that it comprises the steps of: preparing strip-like sections each comprising longitudinal and parallel thread-like elements coated at least partly with at least one layer of raw elastomer material; laying down a first series of said strip-like sections onto a toroidal support, each of them extending in a substantially U-shaped configuration around the cross-section outline of the toroidal support itself and circumferentially distributed according to a circumferential pitch corresponding to a multiple of the strip-like section width; applying first primary portions of annular reinforcing structures against end flaps of said strip-like sections belonging to the first series, at axially opposite positions relative to an equatorial plane of the support drum; laying down on the toroidal support, at least one second series of said strip-like sections each extending according to a U-shaped conformation around the cross-section outline of the toroidal support, between two consecutive sections of the first series, in order to define a first carcass ply together with said last-mentioned sections, each of the sections of the second series having end flaps overlapping the respective primary portions of the annular reinforcing structures at an axially opposite position relative to the end flaps of the sections of the first series; laying down on the toroidal support, a third series of said strip-like sections each extending according to a substantially U-shaped conformation around the cross-section outline of the toroidal support itself and circumferentially distributed according to a circumferential pitch corresponding to a multiple of the strip-like section width; applying second primary portions of said annular reinforcing structures against the end flaps of said strip-like sections belonging to the third series, at axially opposite positions relative to the first primary portions; laying down on the toroidal support, at least one fourth series of said strip-like sections each extending according to a U-shaped conformation around the cross-section outline of the toroidal support, between two consecutive sections of the third series, in order to define, together with said last-mentioned sections, a second carcass ply overlapping the first carcass-ply, each of the sections of the fourth series having end flaps overlapping the respective second primary portions of the annular reinforcing structures at an axially opposite position relative to the end flaps of the sections of the third series.

In more detail, the strip-like sections making up the first and second carcass plies respectively, are provided to be laid down in a respectively crossed orientation, preferably in an orientation inclined at an angle included between 15° and 35° relative to a circumferential extension direction of the toroidal support.

According to a preferential embodiment of the invention, also carried out is the step of applying additional portions of the annular reinforcing structures against the end flaps of the strip-like sections belonging to the fourth series, so that each of said end flaps is enclosed between the second primary portion and the additional portion of the respective annular reinforcing structure.

Advantageously, each of said strip-like sections is laid down so as to form two side portions substantially extending in the direction of the geometric rotation axis of the toroidal support at mutually spaced apart positions in an axial direction, and a crown portion extending at a radially outer position between the side portions, the crown portions of the strip-like sections belonging to the first and second carcass plies respectively being disposed consecutively in side by side relationship along the circumferential extension of the toroidal support.

In more detail, the side portions of said strip-like sections are made radially converge towards the geometric rotation axis of the toroidal support.

It is also provided that the side portions of each strip-like section belonging to the first series and the third series respectively should be each partly covered with a side portion of at least one circumferentially consecutive section belonging to the second series and the fourth series respectively, at a stretch included between a radially outer edge of the respective primary portion of the annular reinforcing structure and a transition region between said side portions and crown portions.

In accordance with a further aspect of the invention, to be also adopted independently of that which has been previously pointed out, accomplishment of at least one of said first and second primary portions of each annular reinforcing structure comprises the steps of: laying down at least one elongated element in concentric coils to form a circumferentially inextensible annular insert substantially in the form of a crown; forming at least one filling body of raw elastomer material; joining the filling body to the first circumferentially inextensible annular insert.

Preferably, said elongated element is deposited directly against the end flaps of the strip-like sections previously deposited on the toroidal support, to form said first annular insert directly in contact with the strip-like sections themselves.

According to a possible preferential solution, said filling body is formed by depositing a continuous strip of elastomer material directly against the annular insert previously applied to the end flaps Of the strip-like sections previously laid-down.

Alternatively, the elongated element is laid down in a forming seat defined in a moulding cavity in which the filling body is subsequently formed, so that joining of said filling body to the annular insert is carried out concurrently with formation of the filling body itself.

In more detail, said joining step can be carried out by applying the filling body against said annular insert previously applied to the end flaps of the strip-like sections laid down on the toroidal support.

Preferably, formation of said additional portion of each annular reinforcing structure comprises the step of depositing at least one elongated element in concentric coils to form an additional circumferentially inextensible annular insert substantially in the form of a crown.

In more detail, said elongated element is preferably laid down directly against the carcass structure during the formation step on the toroidal support.

It is a further object of the invention to provide a carcass structure for vehicle wheel tires, characterized in that said first carcass ply comprises: a first and a second series of strip-like sections arranged in a mutually alternating sequence along the circumferential extension of the carcass structure, said second carcass ply comprises a third and a fourth series of strip-like sections arranged in a mutually alternating sequence along the circumferential extension of the carcass structure, each of said annular reinforcing structures comprising at least: one first primary portion having an axially inner side turned towards end flaps of the sections belonging to the first series and an axially outer side turned towards end flaps of the sections belonging to the second series, and one second primary portion having an axially inner side turned towards end flaps of the sections belonging to the third series and an axially outer side turned towards end flaps of the sections belonging to the fourth series.

In more detail, sections of the first and second series extend in a crossed orientation with respect to the strip-like sections of the third and fourth series, preferably at an angle included between 15° and 35° relative to a circumferential-extension direction.

It is preferably provided that each of said annular reinforcing structures further comprises at least one additional portion disposed against the end flaps of the strip-like sections belonging to the fourth series, on the opposite side relative to the second primary portion of the annular structure itself.

Advantageously, each of said strip-like sections has two side portions substantially extending towards a geometric axis of said carcass structure at mutually spaced apart positions in an axial direction, and a crown portion extending at a radially outer position between the side portions, the crown portions belonging to the sections of the first and second series respectively, and of the third and fourth series respectively, being arranged in mutual side by side relationship along the circumferential extension of the carcass structure.

It is provided that the side portions of said strip-like sections radially converge towards a geometric rotation axis of the carcass structure.

In more detail, the side portions of each strip-like section belonging to the first and the third series respectively should be each partly covered with a side portion of at least one adjacent strip-like section belonging to the second and fourth series respectively, at a stretch included between a radially outer edge of the respective primary portion of the annular reinforcing structure and a transition region between said side portions and crown portions.

Advantageously, the individual strip-like sections belonging to one of said series respectively, are disposed according to a circumferential distribution pitch corresponding to a multiple of the width of the strip-like sections themselves.

Preferably, the strip-like sections each have a width included between 3 and 15 mm, and each of them comprises three to eight thread-like elements.

It is also preferably provided that said thread-like elements should be disposed in the respective strip-like sections according to a mutual distance between centres not lower than 1.5 times the diameter of the thread-like elements themselves.

In accordance with a further independent aspect of the invention, each of said first and second primary portions of each of said inextensible annular structures comprises: a circumferentially inextensible annular insert substantially in the form of a crown disposed coaxially with the carcass structure and close to an inner circumferential edge of the carcass plies, said annular insert being made up of at least one elongated element extending in concentric coils; a filling body of elastomer material having one side joined to the annular anchoring insert.

Preferably, each of said annular reinforcing structures further comprises at least one additional portion disposed against the end flaps of the strip-like sections belonging to the fourth series, on the opposite side relative to the second primary portion of the annular structure itself.

Advantageously, said additional portion comprises an additional circumferentially-inextensible annular insert substantially in the form of a crown, made up of at least one elongated element extending in concentric coils and disposed coaxially with the carcass structure at a position axially close to the filling body of the second primary portion of the respective inextensible annular structure. Preferably, the filling body of elastomer material of each of said primary portions has a hardness included between 48° and 55° Shore D at 23° C.

BRIEF DESCRIPTION OF THE DRAWINGS

Further features and advantages will become more apparent from the detailed description of a preferred, non-exclusive embodiment of a method of manufacturing a carcass structure for tires for vehicle wheels, and a carcass structure obtainable by said method, in accordance with the present invention. This description will be taken hereinafter with reference to the accompanying drawings, given by way of non-limiting example, in which:

FIG. 2 is a diagram showing accomplishment of a continuous strip-like element intended for formation of the carcass ply or plies;

FIG. 3 is a cross-section of an embodiment of said strip-like element;

FIG. 4 is a fragmentary perspective view diagrammatically showing the deposition sequence of a first series of strip-like sections for formation of a first tire carcass ply in accordance with the invention;

FIG. 5 is a fragmentary diametrical section view of a portion of an inextensible annular structure, to be inserted at the tire bead, during a moulding step for manufacturing the same;

FIG. 6 is a fragmentary perspective view of a first primary portion of the inextensible annular structure axially applied against the side flaps of the strip-like sections belonging to the first series and partly covered with the end flaps of strip-like sections belonging to a second series;

FIG. 7 shows a second primary portion of the annular reinforcing structure applied to the end flaps of a third series of strip-like sections previously laid down onto the first carcass ply;

FIG. 9 diagrammatically shows application of said additional portion to the carcass structure, partly seen in cross-section.

DETAILED DESCRIPTION OF THE PREFERRED EMBODIMENTS

Figure 1:
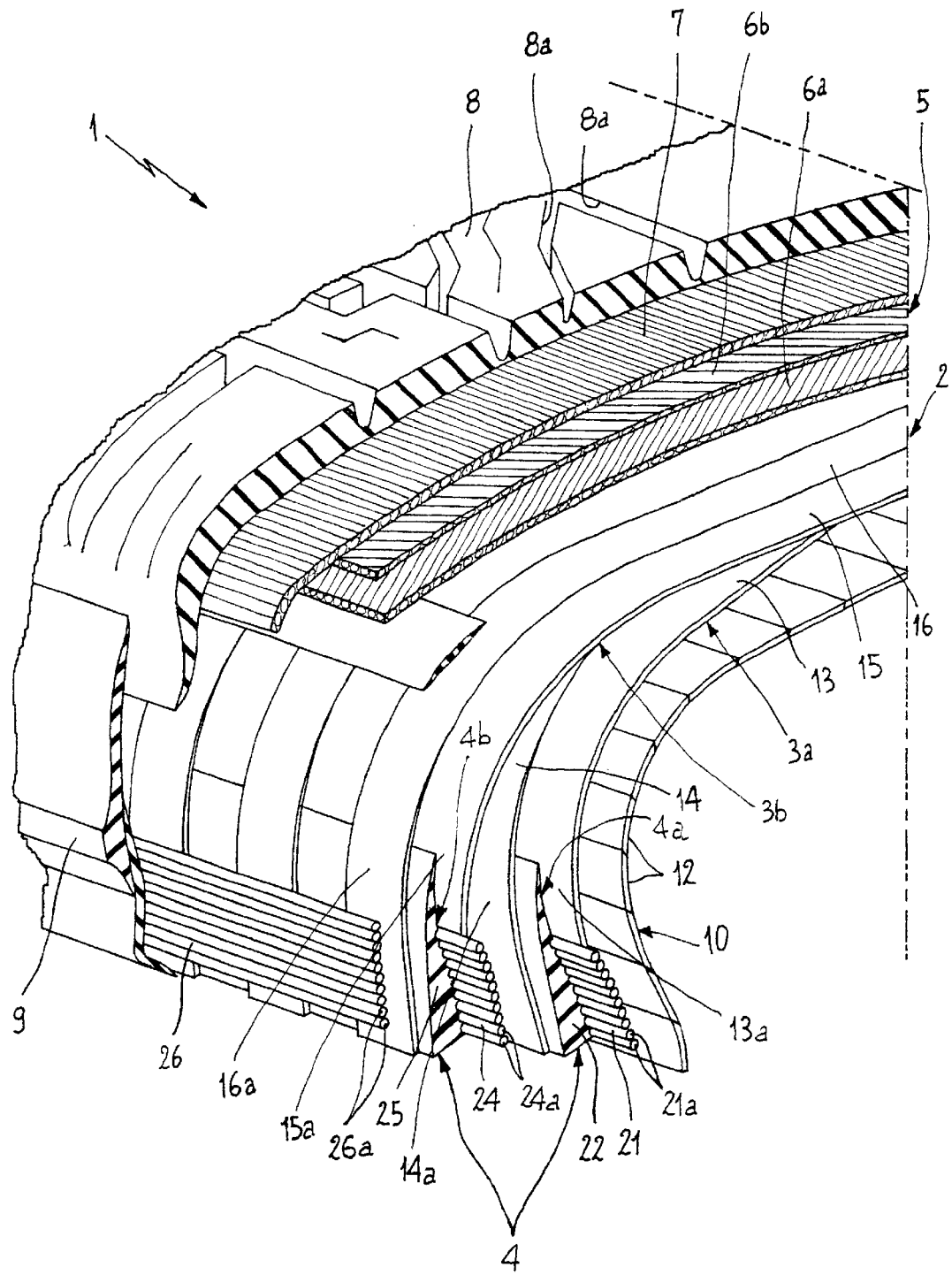
FIG. 1 is a fragmentary split perspective view of a tire provided with a carcass structure manufactured in accordance with the present invention.
Figure 8:
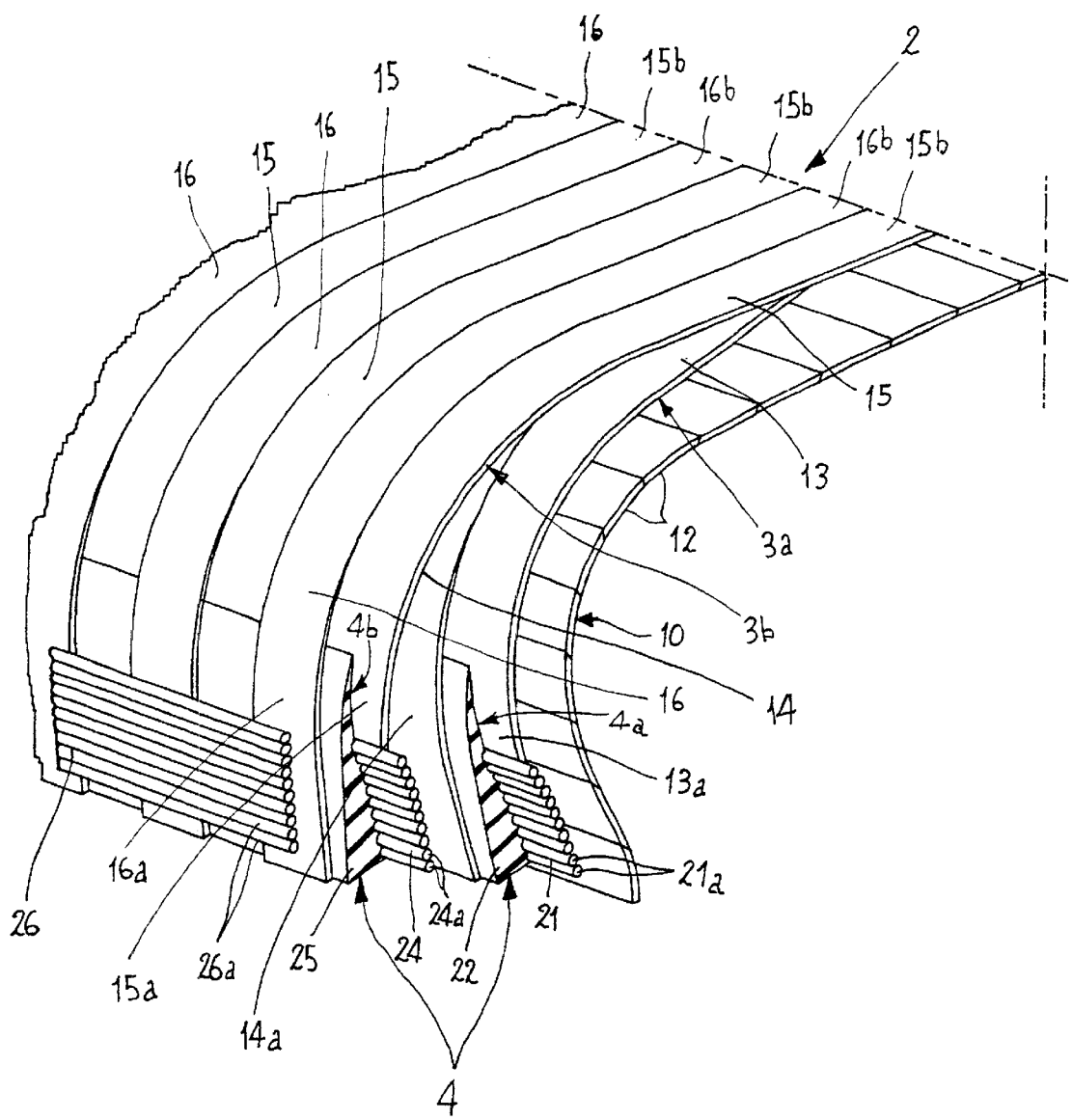
FIG. 8 shows an additional portion of the annular reinforcing structure applied to the end flaps of a fourth series of strip-like sections alternated with the strip-like sections of the third series.

With reference to the drawings, a tire for vehicle wheels having a carcass structure 2 manufactured by a method in accordance with the invention has been generally identified by reference numeral 1.

The carcass structure 2 has a first carcass ply and a second carcass ply 3a, 3b substantially shaped in a toroidal conformation and engaged, by their opposite circumferential edges, with a pair of annular reinforcing structures 4 (only one of which is shown in the drawings), each of which, when the tire has been finished, is located at the region usually identified by the name of "bead".

Applied to the carcass structure 2, at a circumferentially outer position, is a belt structure 5 comprising one or more belt strips 6a, 6b and 7. Circumferentially overlapping the belt structure 5 is a tread band 8 in which, following a moulding operation carried out concurrently with the tire vulcanization, longitudinal and transverse hollows 8a arranged to define a desired "tread pattern" have been formed.

Tire 1 further comprises a pair of so-called "sidewalls" 9 laterally applied to the carcass structure 2 on opposite sides thereof.

The carcass structure 2 can be possibly coated on its inner walls with a so-called "liner" 10, essentially consisting of a layer of an air-proof elastomer material adapted to ensure a tight seal of the tire itself when inflated.

Assembling of the above listed components, as well as production of one or more of same, takes place with the aid of a toroidal support 11, diagrammatically shown in FIG. 9, having a shape matching that of the inner walls of the tire to be made.

The toroidal support 11 can have reduced sizes relative to those of the finished tire, according to a linear measure preferably included between 2% and 5%, taken just as an indication along the circumferential extension of said support at the equatorial plane X—X thereof, coinciding with the equatorial plane of the tire itself.

The toroidal support 11, not described or illustrated in detail as it is not particularly important to the aims of the invention, can be for example made up of a collapsible drum or an inflatable chamber suitably reinforced for taking and keeping the desired toroidal conformation in an inflated condition.

After the above statements, manufacturing of tire 1 first involves formation of the carcass structure 2, beginning with the possible formation of liner 10.

This liner 10 can be advantageously made by circumferentially winding up around the toroidal support 11, at least one ribbon-like small band 12 of an air-proof elastomer material, produced by an extruder and/or a calender placed close to the toroidal support itself. As can be inferred from FIG. 1, winding of the ribbon-like small band 12 substantially takes place in circumferential coils disposed consecutively in side by side relationship so as to follow the cross-section outline of the outer surface of the toroidal support 11.

To the purposes of the present invention, by cross-section outline it is intended the configuration exhibited by the half-section of the toroidal support 11 sectioned in a plane radial to its own geometric rotation axis, not shown in the drawings, coinciding with the geometric rotation axis of the tire and, consequently, of the carcass structure 2 being manufactured.

In accordance with the present invention, the first carcass ply 3a is directly formed on the toroidal support 11 by, as better clarified in the following, laying down a first and a second series of strip-like sections 13, 14 formed of at least one continuous strip-like element 2a preferably having a width included between 3 mm and 15 mm.

The second carcass ply 3b is in turn formed in superposed relationship with the first carcass ply 3a by, as better clarified in the following, laying down a third and a fourth series of strip-like sections 15, 16 that can be made out of said continuous strip-like element 2a as well.

As viewed from FIG. 2, preparation of the continuous strip-like element 2a essentially involves that one or more thread-like elements 17, and preferably three to ten thread-like elements 17, fed from respective reels 17a, should be guided through a first extruder 18 associated with a first extrusion apparatus 19 supplying raw elastomer material through the extruder itself.

It is pointed out that, to the purposes of the present description, by "extruder" it is intended the extrusion apparatus portion also identified in the art as "extrusion head", provided with a so-called "die" passed through by the product being worked at a shaped outlet port conveniently sized for meeting the geometric and dimensional features to be given to the product itself.

The elastomer material and thread-like elements 17 are intimately joined within the extruder 18, giving rise at the extruder outlet to the continuous strip-like element 2a formed of at least one layer of elastomer material 20 in the thickness of which the thread-like elements themselves are incorporated.

Depending on requirements, guiding of the thread-like elements 17 in extruder 18 can take place in such a manner that they are not integrally incorporated into the elastomer material layer 20 but appear on one or both of the surfaces thereof.

The thread-like elements 17 can be each made, for example, either of a textile cord preferably of a diameter included between 0.6 mm and 1.2 mm, or of a metallic cord preferably of a diameter included between 0.3 and 2.7 mm.

Advantageously, if required, the thread-like elements 17 can be disposed in the continuous strip-like element 2a in such a manner that they give the obtained carcass ply 3 unexpected qualities of compactness and homogeneity. To this purpose, the thread-like elements 17 can be disposed for example according to a thickness greater than six thread-like elements per centimetre, circumferentially measured on the carcass ply 3 close to the equatorial plane X—X of tire 1. In any case it is preferably provided that the thread-like elements 17 should be disposed in the strip-like element 2a according to a mutual distance between centres not lower than 1.5 times the diameter of the thread-like elements themselves, in order to enable an appropriate rubberizing action between the respectively adjacent threads.

The continuous strip-like element 2a coming out of extruder 18 can be advantageously guided, possibly through a first accumulator-compensator device 19a, on a deposition apparatus the structure and operating features of which are described in more detail in the European Patent Application No. 97830731.2 in the name of the same Applicant, contents of which is considered as herein incorporated.

This deposition apparatus is suitable for sequentially cutting the continuous strip-like element 2a for obtaining strip-like sections 13, 14, 15, 16 of predetermined length.

Cutting of each strip-like section 13, 14, 15, 16 is immediately followed by deposition of same section onto the toroidal support 11, giving the strip-like section a U-shaped configuration around the cross-section outline of the toroidal support itself, so that in the strip-like section 13, 14, 15 16 two side portions 13a, 14a, 15a, 16a can be identified which extend radially towards the axis of the toroidal support 11, at positions axially spaced apart from each other, as well as a crown portion 13b, 14b, 15b, 16b extending at a radially outer position between said side portions.

Due to the sticking quality of the raw elastomer material forming layer 20 coating the thread-like elements 17, a steady adhesion of the strip-like element 13, 14 to the surfaces of the toroidal support 11 is ensured, even in the absence of liner 10 on the toroidal support itself. In more detail, the above described adhesion appears as soon as the strip-like section 13, 14 comes into contact with the toroidal support 11 at a radially outer region of its cross-section outline.

In addition to, or in place of the above described exploitation of the natural sticking quality of the elastomer material, holding of one or more of the strip-like sections 13, 14 on the toroidal support 11 can be obtained by carrying out a suction action produced through one or more suitable holes arranged on said toroidal support.

The toroidal support 11 can be driven in angular rotation according to a step-by-step movement in synchronism with operation of said deposition apparatus, in such a manner that each cutting action of each strip-like section 13, 14, 15, 16 is followed by deposition of same at a position circumferentially spaced apart from the previously laid down section 13, 14, 15, 16.

In more detail, rotation of the toroidal drum 11 takes place according to an angular pitch to which a circumferential displacement equal to a multiple of the width of each strip-like section 13, 14, 15, 16 and more specifically twice said width, corresponds.

It is to point out that to the aims of the present description the term "circumferential", when not otherwise stated, refers to a circumference lying in the equatorial plane X—X and close to the outer surface of the toroidal support 11.

In accordance with the present invention, the above described operating sequence is such that, by a first full revolution of the toroidal support around its own axis, deposition of a first series of strip-like sections 13, circumferentially distributed according to a circumferential pitch which is twice the width of each of them, is caused. Therefore, as clearly viewed from FIG. 4, an empty space "S" is left between one and the other of the sections belonging to the first series, which empty space, at least at the crown portions 13b of said sections, has the same width as sections themselves.

Preferably, deposition of the strip-like sections 13 belonging to the first series takes place in an inclined orientation relative to the circumferential-extension direction of the toroidal support, preferably at an angle included between 15° and 35°.

Adjustment of the deposition angle of the strip-like sections can be obtained for example by suitably orienting the geometric rotation axis of the drum relative to the deposition apparatus.

Manufacturing of a carcass structure 2 then goes on with the step of applying first primary portions 4a of said inextensible annular structures 4 close to each of the inner circumferential edges of the carcass ply 3 being manufactured, for the purpose of obtaining the carcass regions known as "beads", which are particularly intended for ensuring anchoring of the tire to a corresponding mounting rim.

Each of said first primary portions 4a comprises at least one first circumferentially inextensible annular insert 21, substantially having the shape of a crown concentric with the geometric rotation axis of the toroidal support 11 and located at a circumferentially inner position against the end flaps exhibited by the strip-like sections 13 belonging to the first series.

The first annular insert 21 is preferably made up of at least one elongated metal element wound up in several substantially concentric coils 21a. Coils 21a can be defined either by a continuous spiral or by concentric rings formed of respective elongated elements.

Combined with the first annular insert 21 is a first filling body 22 of elastomer material, preferably of the thermoplastic type, having a hardness included between 48° and 55° Shore D, measured at a temperature of 23° C. and preferably having a radial extension higher than the radial extension of the first annular insert 21.

As shown in FIG. 5, accomplishment of each first primary portion 4a can provide, for example, that within a moulding cavity 23 defined in a mould 23a, 23b the first inextensible annular insert 21 should be formed through deposition of at least one elongated element in concentric coils 21a which are disposed in mutual side by side relationship according to circumferences of an increasingly growing diameter around their geometric winding axis, corresponding to the rotation axis of the finished tire.

This operation can be advantageously carried out by winding the elongated element in a helix-shaped forming seat arranged in a first cheek 23a of mould 23a, 23b which to this purpose can be driven in rotation around a geometric axis thereof.

Deposition of the elongated element can be advantageously preceded by a rubberizing step in which the elongated element itself, preferably of a metal material, is coated with at least one layer of raw elastomer material that, in addition to ensure an excellent rubber-metal bond on the elongated element itself, promotes adhesion of same for its steady placement in said helix-shaped seat.

In addition, at least the first cheek 23a may be advantageously provided to be made of a magnetic material or a material to be electromagnetically activated, so as to suitably attract and retain the elongated element, thereby ensuring a steady positioning of coils 21a as they are formed.

Then within the moulding cavity 23 the first filling body 22 is formed. Forming of said body can be conveniently carried out by interposing, between the first cheek 23a carrying the first annular insert 21 and the second cheek 23b, at least one annular element of raw elastomer material of predetermined volume. This annular element can have any convenient conformation in cross-section, provided its volume corresponds to the inner volume of the moulding cavity 23 when cheeks 23a, 23b are moved close to each other in a closed condition of the mould.

Once the annular element has been positioned between cheeks 23a, 23b, closing of the moulding cavity 23 is carried out by mutual approaching of said cheeks. Under this circumstance, the volume of the moulding cavity 23 is reduced, so that the annular element of raw elastomer material is pressed and is subjected to deforming until it completely fills the moulding cavity itself, thereby forming the first filling body 22 that remains intimately joined to the first annular insert 21.

As an alternative solution to the above description, formation of the filling body 22 can be carried out for example after mutually approaching cheeks 23a, 23b, by filling the moulding cavity 23 with elastomer material introduced by injection, or by adopting any other manner which may be convenient for a person skilled in the art.

By operating as above described, respective first primary portions 4a of the annular reinforcing structures 4 are obtained, accomplishment of which can advantageously take place close to the toroidal support 11, in such a manner that said first primary portions, possibly with the aid of appropriate handling devices, can be directly picked up from mould 23a, 23b and laterally applied at axially opposite positions relative to the equatorial plane of the toroidal support, each of them with the first annular insert 21 against the previously-arranged end flaps of sections 13 belonging to the first series.

As an alternative solution to the preceding description, accomplishment of the first primary portions 4a can involve formation of the first filling body 22 separately from the first annular insert 21, and subsequent union of the first filling body with the first annular insert previously applied to the end flaps of the strip-like sections 13 laid down on the toroidal support 11.

In more detail, in accordance with a preferential embodiment, the first annular insert 21 is preferably directly manufactured against the end flaps of the strip-like sections 13, coils 21a being formed by winding up the thread-like element with the possible aid of rollers or other suitable means acting against the surface of the toroidal support 11.

The sticking quality of the elastomer layer 20 coating the strip-like sections 13 belonging to the first series, as well as of the possible liner 10 previously laid down on the drum itself ensure a steady positioning of the individual coils 21a being formed.

Subsequently, the first filling body 22 can be in turn directly formed against the first annular insert 21, by applying a continuous strip of elastomer material coming out of an extruder placed close to the drum 11 itself, for example. The continuous strip may have the definitive conformation in section of the first filling body 22 already on its coming out of the respective extruder. Alternatively, the continuous strip shall have a reduced section compared with that of the filling body, and the latter will be obtained by application of the strip in several coils disposed in side by side and/or overlapping relationship, so as to define the first filling body 22 in its final configuration.

After application of the first primary portions 4a of the annular reinforcing structures 4, formation of the first carcass ply 3a is completed by deposition of the second series of strip-like sections 14 obtained by cutting the continuous strip-like element 2a to size, which sections 14 are applied to the toroidal drum 11 in the same manner as described for the strip-like sections 13 belonging to the first series.

As clearly viewed from FIG. 6, each section 14 belonging to the second series is laid down in a U-shaped conformation around the cross section outline of the toroidal support 11, between two consecutive sections 13 belonging to the first series and according to an orientation parallel to said sections 13. In more detail, each section 14 belonging to the second series has a respective crown portion 14b circumferentially interposed between the crown portions 13a of sections 13 belonging to the first series, to fill space "S" existing therebetween, as well as a pair of side portions 14a carrying the end flaps of the section itself in superposed relationship with the respective first primary portions 4a of the annular reinforcing structures 4, at axially opposite positions relative to the end flaps of sections 13 belonging to the first series.

In other words, the first primary portion 4a of each annular reinforcing structure 4, having a section outline substantially in the form of a triangle the vertex of which is turned away from the tire axis, has an axially inner side turned towards the end flaps of the strip-like sections 13 belonging to the first series, and an axially outer side turned towards the end flaps of sections 14 belonging to the second series.

In addition, the side portions 14a of each section 14 belonging to the second series may be also provided to partly overlap the side portions 13a of two consecutive sections 13 belonging to the first series, each at a stretch included between the radially outer edge of the respective primary portion 4a and the transition region between the side portion itself and the crown portion 13b, 14b.

Due to the mutual convergency between the contiguous side portions 13a, 14a oriented radially of the geometric axis of the toroidal support 11, overlapping or covering of the side portions 13a of sections 13 belonging to the first series, i.e. the circumferential width of the overlapping regions, progressively decreases starting from a maximum value, which can be detected close to the radially outer edge of the first primary portion 4a of each annular reinforcing structure 4, until a null value at the transition region between the side portions 13a, 14a and crown portions 13b, 14b.

After carrying out deposition of the strip-like sections 14 belonging to the second series in the manner as above described, formation of the second carcass ply 3b is started by laying down the third series of strip-like sections 15.

This deposition step can be performed in the same manner as already described with reference to deposition of sections 13, 14 belonging to the first and second series or in a similar manner.

In a convenient solution, the strip-like sections 15 belonging to the third series are laid down in a crossed orientation relative to sections 13 and 14 of the first and second series, preferably according to a symmetrically opposite angle relative to the last-mentioned sections, with reference to the circumferential-extension direction of carcass structure 2.

Also the strip-like sections 15 belonging to the third series are laid down in a U-shaped configuration around the cross section outline of the first carcass ply 3a, and according to a circumferential pitch corresponding to a multiple of their width, and preferably to twice said width.

Then application of second primary portions 4b of the annular reinforcing structures 4 to the end flaps of the strip-like sections 15 belonging to the third series is carried out, at axially opposite positions relative to the above mentioned first primary portions 4a.

As viewed from the accompanying figures, each of the second primary portions is preferably structured in the same manner as described with reference to the first primary portions 4a.

In particular, each second primary section 4b has a respective second circumferentially-inextensible annular insert 24 made up of at least one respective elongated element disposed in concentric coils 24a so as to form a crown disposed coaxially with the carcass structure 2 and close to the inner circumferential edges of the carcass plies 3a, 3b.

Combined with the second annular insert 24, disposed against the end flaps of the strip-like sections 14, 15 belonging to the second and third series, is a second filling body 25 of elastomer material, having the same conformation as the first filling body 22.

Accomplishment and application of the second annular insert 24 and the second filling body 25, as well as the second primary portion 4b taken as a whole, can take place according to anyone of the previously described modalities, with reference to the first primary portion 4a.

Formation of the second carcass ply 3b is subsequently completed, by deposition of the fourth series of strip-like sections 16 each interposed between two of the strip-like sections 15 belonging to the third series and overlapping the second primary portions 4b by their end flaps, at an axially opposite position relative to the end flaps of sections 14, 15 belonging to the second and third series, respectively.

When deposition of the fourth series of the strip-like sections 16 has been completed, the second primary portion 4b of each annular reinforcing structure, which too has the shape of a triangle in cross section, has an axially inner side turned towards the end flaps of the sections belonging to the third series 15 and an axially outer side turned towards the end flaps of the sections belonging to the fourth series 16.

In accordance with a preferential solution of the invention, after deposition of the strip-like sections 16 belonging to the fourth series has been carried out, formation of the annular reinforcing structures 4 at the beads is completed.

For the purpose, as shown in FIG. 9, for each of the annular reinforcing structures 4 application of an additional portion 26 is provided against the end flaps of the strip-like sections 16 belonging to the fourth series.

Preferably, each additional portion 26 is essentially made up of at least one additional annular insert in the shape of a crown. This additional annular insert 26 can be obtained by winding a respective elongated element for example, in concentric coils 26a at a forming seat 27 arranged in an auxiliary matrix 28, in the same manner as described with reference to formation of the first and second annular inserts 21, 24.

By axially moving matrix 28 towards the toroidal support 11, application of the additional annular insert 26 against the carcass structure 2 is carried out.

Alternatively, said elongated element can be directly wound against the second carcass ply 3b previously formed on the toroidal support 11, so as to create the second annular insert 26 directly in contact with the carcass ply itself.

Following this operation, each of the end flaps of sections 16 belonging to the fourth series advantageously keeps an enclosed position between the second primary portion 4b and the addition portion 26 of the respective annular reinforcing structure 4.

In tires of the radial type, a belt structure 5 is usually applied to the carcass structure 2.

This belt structure 5 can be manufactured in any manner convenient for a person skilled in the art and, in the embodiment shown, it essentially comprises a first and a second belt strips 6a, 6b having cords with a respectively crossed orientation. Superposed on the belt strips is an auxiliary belt strip 7, for example obtained by winding of at least one continuous cord in substantially circumferential coils disposed axially in side by side relationship, around the belt strips themselves.

Then, the tread band 8 is applied to the belt structure 5, whereas sidewalls 9 are applied to the side portions of the carcass structure 2, which elements are also obtained in any manner convenient for a person skilled in the art.

Examples of a belt structure, sidewalls and a tread band to be advantageously adopted for completely manufacturing tire 1 on the toroidal support 11 are described in the European Patent Application No. 97830632.2 in the name of the same Applicant.

Tire 1 thus manufactured is now ready to be submitted, possibly after removal from support 11, to a vulcanization step that can be conducted in any known and conventional manner.

The present invention achieves important advantages.

In fact, the carcass structure in reference can be directly obtained on a toroidal support on which the whole tire can be advantageously formed. In this way, all problems connected with manufacturing, storage and management of semifinished products, common to manufacturing processes of traditional conception, are eliminated.

As compared with the method described in document U.S. Pat. No. 5,362,343 the manufacturing time for the carcass ply can be greatly reduced, by virtue of the simultaneous deposition of as many thread-like elements as they are contained in each strip-like section 13, 14 or in the continuous strip-like element 2a from which sections 13, 14 come. Employment of strip-like sections 13, 14 also dispenses with the need for previously laying down liner 10 on the toroidal support 11. The elastomer layer 20 employed in forming the continuous strip-like element 2a is in fact adapted by itself to ensure an efficient adhesion of same to the toroidal support 11, thereby ensuring a steady positioning of the individual sections 13, 14.

Accuracy in positioning of the strip-like sections 13, 14 and thread-like elements integrated thereinto is further improved by the fact that each strip-like section has an important structural consistency that makes it insensitive to vibrations or similar oscillation effects which can be transmitted by the deposition apparatus. In this connection it is to note that deposition of individual cords, as described in U.S. Pat. No. 5,362,343, may be somewhat problematic, exactly due to vibrations and/or oscillations undergone by said cords during the deposition step.

Furthermore, simultaneous deposition of a plurality of thread-like elements in accordance with the invention enables the deposition apparatus to be operated at slower rates than required when deposition of individual cords is concerned, which is a further advantage in terms of working accuracy without on the other hand impairing productivity.

Besides, deposition of strip-like sections directly crownwise to a toroidal support of an outline substantially identical with that of the finished tire enables densities to be achieved that cannot be reached in the art by known methods providing deposition of a carcass ply in the form of a cylindrical sleeve and subsequent shaping of same into a toroidal form, with consequent thinning of the carcass ply cords disposed crownwise to the finished tire.

In addition to the above, each strip-like section can be steadily fastened to the toroidal support by a vacuum effect produced through possible suction ducts, which steady fastening by vacuum cannot be achieved by known processes carrying out deposition of individual cords.

The construction and structure conception of the subject tire, particularly with reference to its carcass structure 2, enables important improvements to be achieved in terms of structural strength, above all close to the sidewalls and beads where a greater structural strength is usually required, as well as in terms of behaviour, especially in connection with the effects of the slip thrusts that occur when tires are run on bends, at the same time benefiting from all advantages typically correlated with a single-ply carcass structure.

In particular, the construction features of the inextensible annular structures 4 and the modalities according to which they are integrated in the carcass ply are such that they further increase the structural strength of tire 1 at the bead and sidewall regions.

In fact, the presence of the circumferentially inextensible annular inserts 21, 24, 26 intimately joined to the carcass plies 3a, 3b offers an excellent "link" with the thread-like elements 17 belonging to the different series of strip-like sections 13, 14, 15, 16. Thus the carcass structure 2 is further strengthened at the regions corresponding to the tire 1 beads without for the purpose requiring employment of additional strip-like inserts, usually called "flippers", wound as a loop around the inextensible annular structures 4, to which on the contrary resort is made in the known art.

As a matter of fact, due to the construction conception of the annular reinforcing structures 4, the tire beads are prevented from deforming, under the effects of slip thrusts, or from rotating around their rest points against the respective security humps provided in the wheel rim.

In particular, it is to note that the presence of the first insert 21, the second insert 24 and the auxiliary insert 26, disposed in direct contact with the end flaps of the strip-like sections, efficiently prevents the bead tendency to bend and rotate under the effect of the slip thrusts.

Under this point of view, the behaviour of the annular reinforcing structure 4 is substantially similar to that of a reinforcing structure as described in the European patent application No. 97830731.2 in the name of the same Applicant, to which please refer for further details. It is also to note that the annular inserts 21, 24 and 26 furnish a further structural protection of the tire at the beads.

The structural strength at the tire sidewalls, in particular with reference to torsional stresses induced in the acceleration and braking steps, is greatly increased, by virtue of the mutually-crossed arrangement of the strip-like sections 14, 15 belonging to the second and third series respectively, which are disposed inside the annular reinforcing structures 4.

This aspect is particularly advantageous with reference to high-performance low-profile tires where the structural strength of the sidewalls is greatly critical, also due to the high torque values that the tire must be able to transmit.

What is claimed is:

1. A method of manufacturing a carcass structure for a vehicle tire, comprising:

preparing strip sections, each comprising longitudinal and parallel thread elements at least partly coated with at least one layer of raw elastomer material;

laying down a first series of the strip sections on a toroidal support, each of the strip sections extending in a substantially U-shaped conformation around a cross-sectional outline of the toroidal support and circumferentially distributed according to a circumferential pitch corresponding to a multiple of a width of the strip sections of the first series;

applying first primary portions of annular reinforcing structures against end flaps of the strip sections of the first series at axially-opposite positions relative to an equatorial plane of the toroidal support;

laying down on the toroidal support at least one second series of the strip sections, each extending in a substantially U-shaped conformation around the cross-sectional outline of the toroidal support between two consecutive strip sections of the first series, in order to define, together with the strip sections of the first series, a first carcass ply, each of the strip sections of the at least one second series comprising end flaps overlapping respective first primary portions of the annular reinforcing structures at an axially-opposite position relative to the end flaps of the strip sections of the first series;

laying down on the toroidal support a third series of the strip sections, each extending in a substantially U-shaped conformation around the cross-sectional outline of the toroidal support and circumferentially distributed according to a circumferential pitch corresponding to a multiple of the width of the strip sections of the third series;

applying second primary portions of the annular reinforcing structures against end flaps of the strip sections of the third series at axially-opposite positions relative to the first primary portions; and laying down on the toroidal support at least one fourth series of the strip sections, each extending in a substantially U-shaped conformation around the cross-sectional outline of the toroidal support between two consecutive strip sections of the third series, in order to define, together with the strip sections of the third series, a second carcass ply overlapping the first carcass ply, each of the strip sections of the at least one fourth series comprising end flaps overlapping respective second primary portions of the annular reinforcing structures at an axially-opposite position relative to the end flaps of the strip sections of the third series.

2. A method of manufacturing a vehicle tire, comprising:

manufacturing a carcass structure;

applying a belt structure to the carcass structure at a circumferentially-outer position of the carcass structure;

circumferentially superposing a tread band on the belt structure; and providing sidewalls on opposite side portions of the carcass structure;

wherein manufacturing the carcass structure comprises:
preparing strip sections;
laying down a first series of the strip sections on a toroidal support;
applying first primary portions of annular reinforcing structures against end flaps of the strip sections of the first series at axially-opposite positions relative to an equatorial plane of the toroidal support;
laying down on the toroidal support at least one second series of the strip sections;
laying down on the toroidal support a third series of the strip sections;
applying second primary portions of the annular reinforcing structures against end flaps of the strip sections of the third series at axially-opposite positions relative to the first primary portions; and
laying down on the toroidal support at least one fourth series of the strip sections;

wherein each strip section comprises longitudinal and parallel thread elements at least partly coated with at least one layer of raw elastomer material, wherein each strip section of the first series extends in a substantially U-shaped conformation around a cross-sectional outline of the toroidal support, wherein each strip section of the first series is circumferentially distributed according to a circumferential pitch corresponding to a multiple of a width of the strip sections of the first series, wherein each strip section of the at least one second series extends in a substantially U-shaped conformation around the cross-sectional outline of the toroidal support between two consecutive strip sections of the first series, in order to define, together with the strip sections of the first series, a first carcass ply, wherein each strip section of the at least one second series comprises end flaps overlapping respective first primary portions of the annular reinforcing structures at an axially-opposite position relative to the end flaps of the strip sections of the first series, wherein each strip section of the third series extends in a substantially U-shaped conformation around the cross-sectional outline of the toroidal support, wherein each strip section of the third series is circumferentially distributed according to a circumferential pitch corresponding to a multiple of a width of the strip sections of the third series, wherein each strip section of the at least one fourth series extends in a substantially U-shaped conformation around the cross-sectional outline of the toroidal support between two consecutive strip sections of the third series, in order to define, together with the strip sections of the third series, a second carcass ply overlapping the first carcass ply, and wherein each strip section of the at least one fourth series comprises end flaps overlapping respective second primary portions of the annular reinforcing structures at an axially-opposite position relative to the end flaps of the strip sections of the third series.

3. The method of claim 2, wherein the strip sections of the first series and the at least one second series are laid down in a crossed orientation with respect to the strip sections of the third series and the at least one fourth series.

4. The method of claim 3, wherein the strip sections of the first series and the at least one second series are laid down in a first orientation inclined at an angle included between 15° and 35° relative to a circumferential-extension direction of the toroidal support, and wherein the strip sections of the third series and the at least one fourth series are laid down in a second orientation inclined at an angle included between 15° and 35° relative to the circumferential-extension direction of the toroidal support.

5. The method of claim 2, further comprising applying additional portions of the annular reinforcing structures against the end flaps of the strip sections of the at least one fourth series, so that each end flap of the strip sections of the at least one fourth series is enclosed between the second primary portions and the additional portions of respective annular reinforcing structures.

6. The method of claim 2, wherein each of the strip sections is laid down so as to form two side portions, substantially extending in a direction of a geometric rotation axis of the toroidal support at mutually-spaced-apart positions in an axial direction, and a crown portion, extending at a radially-outer position between the side portions, wherein the crown portions of the strip sections of the first series and the at least one second series are disposed consecutively in side-by-side relationship along a circumferential extension of the toroidal support, and wherein the crown portions of the strip sections of the third series and the at least one fourth series are disposed consecutively in side-by-side relationship along a circumferential extension of the toroidal support.

7. The method of claim 6, wherein the side portions of each strip section of the first series are each partly overlapped by a side portion of at least one circumferentially-consecutive strip section of the at least one second series, between a radially-outer edge of the first primary portions of the annular reinforcing structures and a transition region from the side portions of the strip sections of the at least one second series to the crown portions of the strip sections of the at least one second series, and wherein the side portions of each strip section of the third series are each partly overlapped by a side portion of at least one circumferentially-consecutive strip section of the at least one fourth series, between a radially-outer edge of the second primary portions of the annular reinforcing structures and a transition region between the side portions of the strip sections of the at least one fourth series and the crown portions of the strip sections of the at least one fourth series.

8. The method of claim 6, wherein the side portions of the strip sections radially converge toward a geometric rotation axis of the toroidal support.

9. The method of claim 2, wherein accomplishment of at least one of the first and second primary portions of each annular reinforcing structure comprises the steps of:

laying down at least one elongated element in concentric coils to form a first circumferentially-inextensible annular insert substantially in a form of a crown;

forming at least one filling body of elastomer material; and joining the at least one filling body to the first annular insert.

10. The method of claim 9, wherein the at least one elongated element is deposited directly against end flaps of at least one of the first and third strip sections previously deposited on the toroidal support to form the first annular insert.

11. The method of claim 9, wherein the at least one filling body is formed by depositing a continuous strip of elastomer material directly against the first annular insert.

12. The method of claim 9, wherein the at least one elongated element is laid down in a forming seat defined in a moulding cavity in which the at least one filling body is subsequently formed, so that joining of the at least one filling body to the first annular insert is carried out concurrently with formation of the at least one filling body.

13. The method of claim 9, wherein the joining step is carried out by applying the at least one filling body against the first annular insert.

14. The method of claim 5, wherein formation of the additional portions of the annular reinforcing structures comprises the step of depositing at least one elongated element in concentric coils to form an additional circumferentially-inextensible annular insert substantially in the form of a crown.

15. The method of claim 14, wherein the at least one elongated element is laid down directly against the strip sections of the at least one fourth series during the formation of the additional portions.

* * * * *